June 21, 1960 W. J. STREAT 2,941,328
INSECT ELECTROCUTING DEVICES
Filed April 6, 1959 2 Sheets-Sheet 1
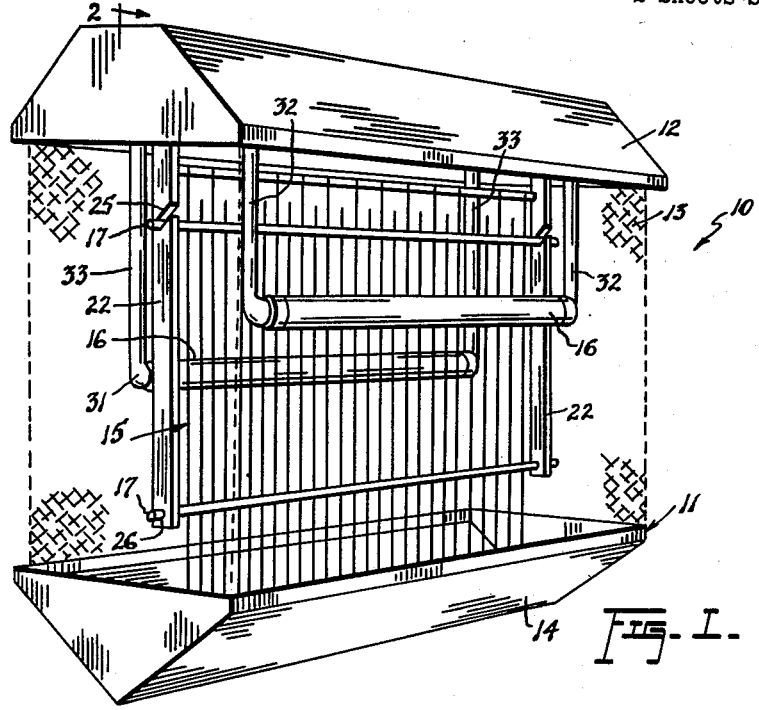
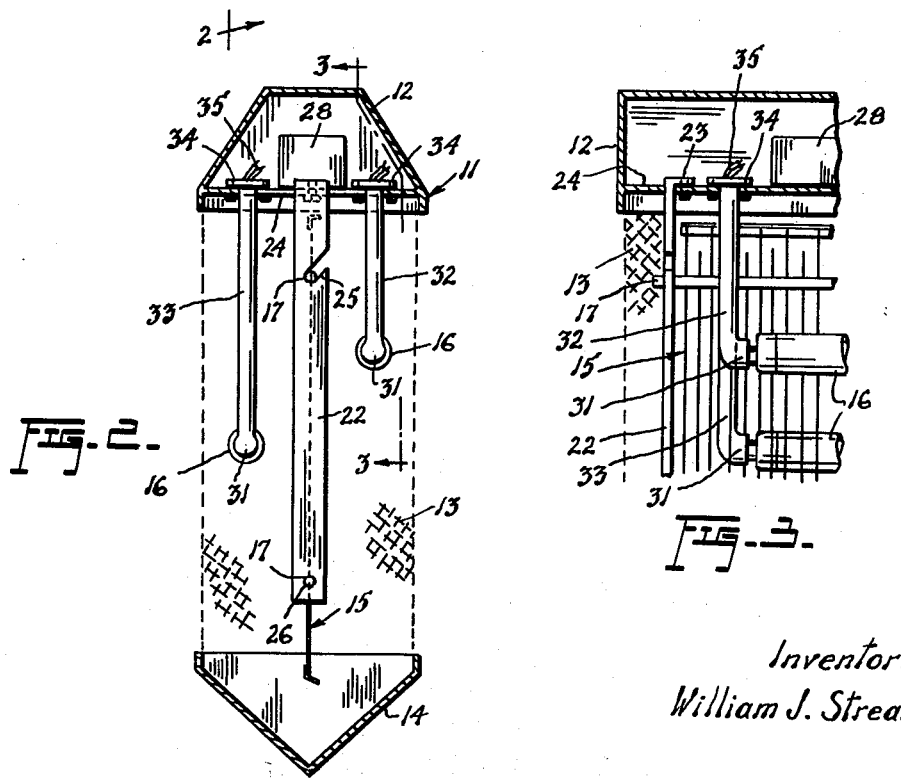
Inventor:
William J. Streat

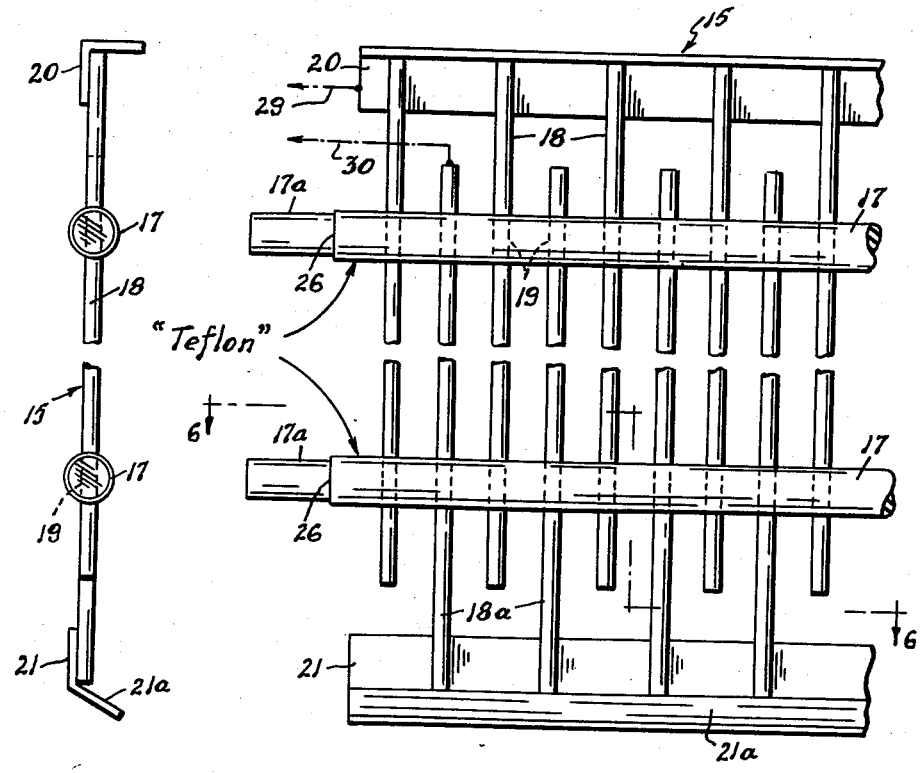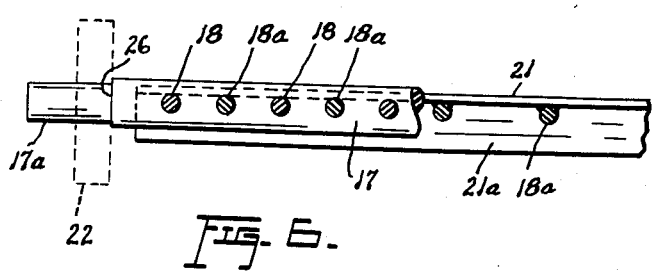

United States Patent Office 2,941,328
Patented June 21, 1960

2,941,328
INSECT ELECTROCUTING DEVICES

William J. Streat, Alexandria, Va., assignor, by direct and mesne assignments, of one-fourth to William J. Streat, one-fourth to Allan W. Houghton, and one-half to William Smilardo, all of Alexandria, Va.

Filed Apr. 6, 1959, Serial No. 804,453

6 Claims. (Cl. 43—112)

This invention relates to new and useful improvements in insect electrocuting devices of the type having a grid consisting of a set of spaced parallel electrode rods in circuit with a source of high voltage current whereby flies, moths, bugs, and other insects are electrocuted by coming in contact with the grid, and the principal object of the invention is to provide a device of this nature wherein the grid is arranged so that it does not become obstructed by dead insects and is otherwise well adapted to perform its intended function.

An important feature of the invention, therefore, resides in the provision of novel grid mounting means, while another important feature lies in the structure of the grid per se.

Another important feature of the invention resides in the arrangement of the entire electrocuting device, including the housing thereof with mounting means for the grid as well as for insect attracting lamps which are used in conjunction therewith.

Some of the advantages of the invention reside in its simplicity of construction, efficiency of operation, accessibility for convenient servicing, and in its adaptability to economical manufacture.

With the foregoing more important objects and features in view and such other objects and features as may become apparent as this specification proceeds, the invention will be understood from the following description taken in conjunction with the accompanying drawings, wherein like characters of reference are used to designate like parts, and wherein:

Figure 1 is a perspective view of the insect electrocuting device in accordance with the invention, the guard thereof being shown by dotted lines for convenience of illustration;

Figure 2 is a vertical sectional view, taken substantially in the plane of the line 2—2 in Figure 1;

Figure 3 is a fragmentary sectional view, taken substantially in the plane of the line 3—3 in Figure 2;

Figure 4 is an enlarged, fragmentary elevational view of the grid;

Figure 5 is a side edge view of the grid; and

Figure 6 is a fragmentary sectional view, taken substantially in the plane of the line 6—6 in Figure 4.

Referring now to the accompanying drawings in detail, the insect electrocuting device in accordance with the invention is designated generally by the reference numeral 10 and embodies in its construction a housing 11 which is preferably suspended in any suitable manner from a suitable overhead support (not shown). The housing 11 includes an upper hood section 12, an intermediate guard section 13 and a lower pan section 14, these sections being separably connected together by suitable clamps or other quickly separable elements (also not shown), so that access to the interior of the housing may be readily had.

An electrocuting grid designated generally by the numeral 15 is mounted in the intermediate section 13 by means hereinafter described, so that insects electrocuted by the grid drop into the pan section 14 from which they may be periodically emptied. Also, a pair of insect attracting lamps 16 are mounted in the section 13 adjacent and at opposite sides of the grid 15, by means hereinafter described, the purpose of these lamps being, of course, to attract insects into the section 13 for electrocution by the grid.

The grid 15 embodies in its construction a pair of vertically spaced, horizontally extending supporting bars 17 which are formed from resiliently yieldable yet relatively rigid, fireproof material having good electrical insulating properties. I have found that material manufactured by du Pont under the commercial name of "Teflon" is particularly well suited for this purpose, although it is to be understood that other materials having comparable physical properties may also be employed. A set of electrode rods 18, 18A, which are preferably made of stainless steel, are carried by the supporting bars 17, this being effected by extending the electrode rods through aligned bores 19 formed transversely in the supporting bars, as will be readily apparent. The electrode rods fit tightly into the bores so that they are frictionally held against sliding, and the rods are disposed vertically in spaced parallel relation, as shown.

Although the electrode rods are of the same length, they are alternately longitudinally staggered so that the upper ends of the rods 18 project above the upper ends of the rods 18a and the lower ends of the rods 18a project below the lower ends of the rods 18. A connecting member 20 of an L-shaped cross section is disposed horizontally at the top of the grid and has the upper ends of the rods 18 secured thereto, as by welding. Similarly, the lower ends of the rods 18a are secured to a connecting member 21 which is similar to the member 20 but has its lateral flange 21a sloping downwardly, as is best shown in Figure 5. The grid is mounted vertically in the housing section 13 and, by virtue of this positioning, insects which come in contact with the grid and are electrocuted thereby may simply drop off into the pan section 14, without passing through the grid and possibly obstructing the same, as would occur if the grid were not vertically disposed. Moreover, the downwardly slanting flange 21a of the connecting member 21 serves to laterally deflect the dropping insects, so that they do not accumulate on the member 21 and cause obstruction of the grid.

The mounting of the grid in the housing section 13 is effected by a pair of spaced, vertical straps 22 which have free lower ends but are secured at their upper ends, as indicated at 23, to the bottom 24 of the hood section 12. The ends of the supporting bars 17 project beyond the side edges of the grid and the upper portions of the straps 22 are provided with open-ended, inwardly sloping slots 25 so that the end portions of the upper of the bars 17 may be inserted laterally therein. The end portions of the lower of the bars 17 are received in apertures 26 formed in the lower end portions of the straps 22, the straps 22 being rigid yet sufficiently resiliently yieldable so that their lower end portions may be spread apart to facilitate insertion of the end portions of the lower supporting bar in the apertures 26, after the end portions of the upper supporting bar have been inserted in the slots 25. In this manner, the grid may be quickly and easily installed and removed, without the use of any screws or other fastening elements. The end portions of the bars 17 are diametrically reduced as shown at 17a, so as to provide shoulders 27 which abut the straps 22 and prevent the grid from shifting.

The hood section 12 is hollow and accommodates equipment such as a transformer 28 for supplying high-voltage current to the grid and a reactance (not shown) for energizing the lamps 16. The wiring connections of these electrical components are conventional and well known in the art, as for example, in U.S. Patent No. 1,848,614 issued March 8, 1932 to W. F. Folmer et al. One of the high tension conductors leading from the transformer is connected to the upper member 20 as indicated at 29, while the second conductor is connected to the upper end of one of the electrode rods 18a as indicated at 30, whereby it is not necessary to extend the second conductor all the way down to the member 21. The connection of the conductors 29, 30 to the grid is effected by suitable spring clips, or the like (not shown), whereby the conductors may be quickly and easily disconnected when the grid is to be removed.

The underside of the bottom 24 of the hood section 12 is coated with suitable reflective material, and the aforementioned lamps 16, capable of producing so-called "black light" for attracting insects, are mounted in conventional sockets 31 provided at the lower ends of pairs of vertical supporting tubes 32, 33, the upper ends of which are secured to the bottom 24 of the hood section as indicated at 34. The conductors 35 leading from the reactance in the hood section, are extended through the tubes 32, 33 and connected to the sockets 31 of the lamps. The tubes 33 are somewhat longer than the tubes 32, whereby the lamp at one side of the grid is disposed at a higher level than the lamp at the opposite side, in order to effect a better distribution of light over the grid.

It is to be particularly noted that by virtue of the "Teflon" supporting bars 17, the grid 15 as a whole is flexible to some extent and the electrode rods 18, 18a thereof are resiliently supported. Moreover, the fireproof nature of the "Teflon" bars prevents them from being damaged in the event that some insects should be caught on the grid and burned.

The guard section 13 of the housing is in the form of an expanded metal screen, having openings large enough to permit passage of insects therethrough, but small enough to prevent the entry of birds, et cetera, and also to safeguard against the possibility of persons coming in contact with the electrocuting grid.

While in the foregoing there has been shown and described the preferred embodiment of the invention, various modifications may become apparent to those skilled in the art to which the invention relates. Accordingly, it is not desired to limit the invention to this disclosure, and various modifications may be resorted to, such as may lie within the spirit and scope of the appended claims.

What is claimed as new is:

1. In an insect electrocuting device, an electrocuting grid and mounting means therefor, said grid including a pair of spaced parallel supporting bars and a set of spaced parallel electrode rods extending transversely of and supported by said bars, said mounting means including a pair of spaced parallel straps disposed at the ends of said bars, said straps being adapted at one end thereof for attachment to supporting structure, and means removably connecting the end portions of said bars to said straps.

2. The device as defined in claim 1 wherein said straps are provided adjacent said one end thereof with inclined and open-ended slots, the end portions of one of said bars being removably received in said slots, the other end portions of said straps being provided with apertures and being resiliently movable apart from each other whereby to removably receive the end portions of the other of said bars in said apertures.

3. In an insect electrocuting device, an electrocuting grid comprising a pair of spaced parallel supporting bars formed from insulating material, a set of spaced parallel electrode rods extending transversely through and supported by said bars, and a pair of elongated connecting members of conductive material disposed at the outside of the respective supporting bars in spaced parallel relation therewith, the alternate electrode rods in the set being secured at one end thereof to one of said connecting members and separated at their other end from the other connecting member, and means for maintaining a difference of potential between the adjacent rods in the set.

4. The device as defined in claim 3 wherein the insulating material of said supporting rods is resiliently flexible and fireproof.

5. The device as defined in claim 3 wherein the material from which said supporting rods are formed comprises "Teflon."

6. The device as defined in claim 3 wherein said grid is adapted to be mounted in a vertical plane whereby insects electrocuted thereby may drop therefrom without passing through the same, said supporting bars of the vertically mounted grid being horizontal and said connecting members being disposed at the top and bottom of the grid, the connecting member at the bottom of the grid having a vertical flange secured to the alternate electrode rods in the set and a downwardly sloping lateral flange whereby to deflect electrocuted insects and prevent accumulation thereof on the bottom portion of the grid.

References Cited in the file of this patent

UNITED STATES PATENTS 1,848,614   Folmer et al. _____ Mar. 8, 1932